United States Patent [19]

Schroeder

[11] 3,968,374

[45] July 6, 1976

[54] X-RAY CASSETTE HOLDER HAVING LEVER MEANS FOR POSITIONALLY ADJUSTING A CASSETTE SUPPORTING MEMBER

[76] Inventor: Charles H. Schroeder, Box 9414, 6501 Hadley, Raytown, Mo. 64133

[22] Filed: Nov. 22, 1974

[21] Appl. No.: 526,128

[52] U.S. Cl.............................. 250/468; 250/471; 250/521
[51] Int. Cl.[2]......................................... G11B 1/00
[58] Field of Search ........... 250/468, 471, 511, 512, 250/521

[56] References Cited
UNITED STATES PATENTS

| | | | |
|---|---|---|---|
| 3,502,878 | 3/1970 | Stewart et al......................... | 250/512 |
| 3,764,808 | 10/1973 | Lackey et al.................. | 250/511 X |
| 3,826,922 | 7/1974 | Ingles................................. | 250/471 |

Primary Examiner—Davis L. Willis
Attorney, Agent, or Firm—Lowe, Kokjer, Kircher et al.

[57] ABSTRACT

An X-ray cassette holder is constructed for use with X-ray equipment to properly position a rectangular film cassette having the longitudinal axis of the cassette oriented either horizontally or vertically. The cassette is received between a pair of vertically spaced channels that are supported on a plate. A pair of levers couple the lower channel to the plate and are pivotal to adjust the spacing between the two channels. A stop plate for horizontally centering the cassette is carried on the lower channel and is moved laterally a preselected distance as the levers pivot. A switch mechanism adjusts the collimator diaphragm controls as the levers pivot to automatically conform the size and orientation of the beam to the size and orientation of the cassette.

8 Claims, 6 Drawing Figures

X-RAY CASSETTE HOLDER HAVING LEVER MEANS FOR POSITIONALLY ADJUSTING A CASSETTE SUPPORTING MEMBER

BACKGROUND AND SUMMARY OF THE INVENTION

This invention relates to a cassette holder for positioning an X-ray film cassette in the path of an incoming X-ray beam.

In X-ray processes such as the taking of chest X-rays, the generated X-rays are formed into a beam by a collimator which directs the beam toward the chest of the patient and onto sensitive X-ray film that is contained in a rectangular cassette positioned beyond the patient. Conventional collimators are equipped with diaphragm devices of various types which are adjustable in order to vary the size of the X-ray beam. Due to recently enacted regulations, as well as general safety considerations, it is necessary for the X-ray beam to coincide exactly with the size of the film cassette toward which it is directed. Film cassettes having a standard size are most often used, although other sizes are available. However, the standard size cassette is used in both an upright and a transverse orientation so that the collimator diaphragm must therefore be frequently adjusted to vary the beam size in accordance with the cassette orientation.

At present, the collimator diaphragm is typically adjusted to bring the X-ray beam into conformity with the cassette by a manual procedure which utilizes a tracer light beam emitted from the collimator. A cassette is first inserted in a holding device and oriented as desired. After the cassette is positioned at the proper elevation, depending upon the height of the patient, the diaphragm controls are manually manipulated as the technician attempts to visually determine when the beam falls exactly on the four edges of the film cassette. Aside from the excessive time consumed by this tedious procedure, the present practice is unsatisfactory because of the error that invariably results, despite the care taken or the skill of the technician. Due to the nature of X-rays, the inaccurate correspondence in size or position of the beam with the cassette frequently leads to potentially dangerous situations.

It is therefore an important object of the present invention to provide an improved X-ray cassette holder for positioning a cassette in proper alignment with an incoming X-ray beam regardless of whether the longitudinal axis of the cassette is oriented either horizontally or vertically.

A further important object of the invention is to provide, in a cassette holder of the character described, means for conforming the dimensions and orientation of the X-ray beam to the dimensions and orientation of the film in the cassette. It is a significant feature of the invention that the collimator diaphragm is automatically adjusted to direct a beam having dimensions which correspond exactly to the dimensions of the film.

Another object of the invention is to provide a cassette holder of the character described that is easily and conveniently adjustable in vertical position.

Yet another object of the invention is to provide a means, associated with a cassette holder of the character described, for indicating the elevation of an inserted cassette to facilitate vertical alignment of the collimator therewith.

An additional object of the invention is to provide a cassette holder of the character described which includes means for preventing the emission of an X-ray beam unless the cassette is properly positioned with respect to the beam.

A still further object of the invention is to provide a cassette holder of the character described wherein the components are readily accessible for inspection, repair and replacement.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
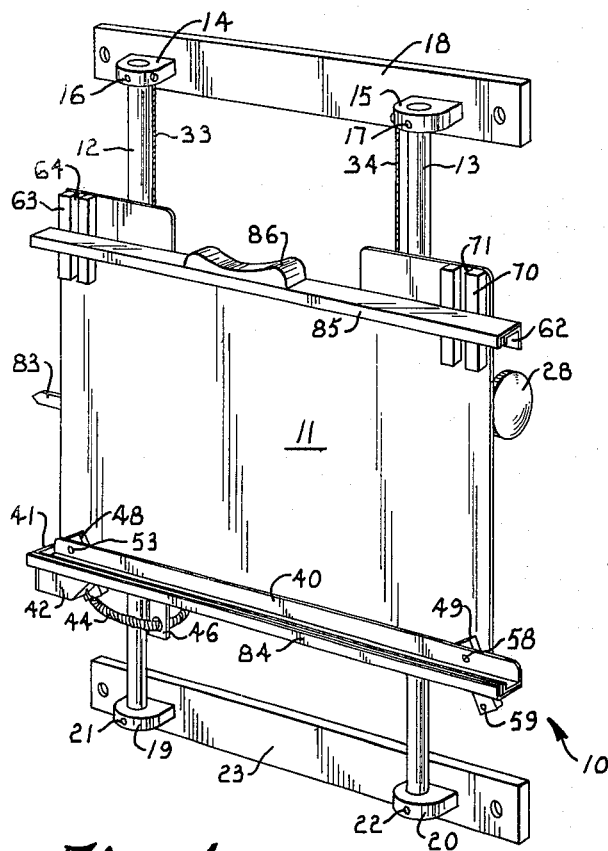
FIG. 1 is a perspective view from the front of an X-ray cassette holder constructed in accordance with a preferred embodiment of the invention.

Referring now to the drawings in detail, a cassette holder embodying the present invention is generally designated by reference numeral 10. Cassette holder 10 is used to position a conventional rectangular film cassette (not shown) in the path of an X-ray beam emitted by an X-ray generating unit (also not shown) which may also be of conventional construction and operation. A collimator, included in a generating unit, forms the X-rays into a rectangular beam, the size of which is determined by an adjustable diaphragm device that is controlled by servomotors and associated controls. Conventional collimators are adjustable in elevation and are typically provided with a height scale that indicates the vertical center of the X-ray beam.

Cassette holder 10 includes a substantially rectangular panel or plate 11 that is mounted for selective vertical movement on a pair of spaced cylindrical posts 12 and 13. With reference to FIG. 1, the upper ends of posts 12 and 13 are received in respective apertured brackets 14 and 15 and secured thereto by set screws 16 and 17. Brackets 14 and 15 extend from an upper mounting block 18, same being adapted to be mounted to a wall by screws or the like. Similarly, the lower ends of posts 12 and 13 are secured to respective apertured brackets 19 and 20 by set screws 21 and 22. Brackets 19 and 20 extend from a lower mounting block 23 which is adapted to be mounted to the wall below block 18.

Figure 3:
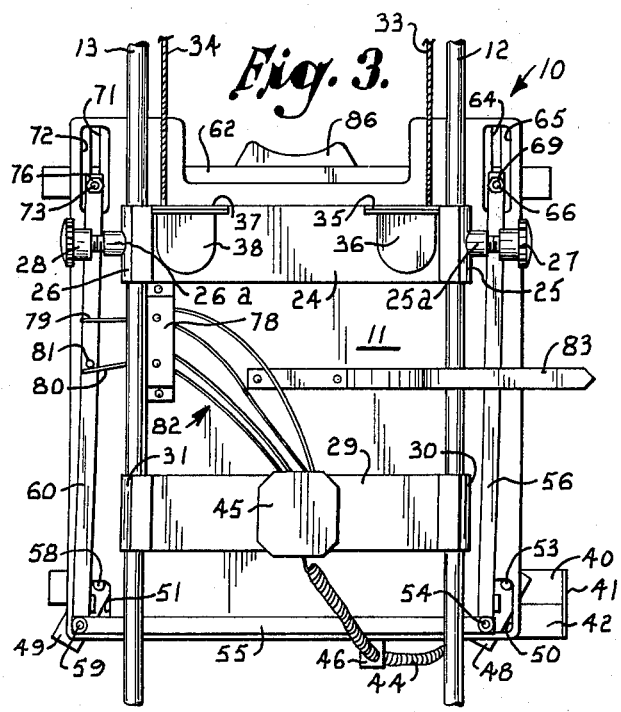
FIG. 3 is an elevational view of the cassette holder taken from the rear of FIG. 2.
Figure 6:
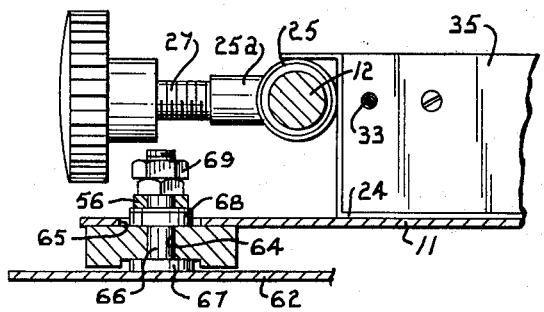
FIG. 6 is an enlarged, fragmentary, sectional view taken generally along line 6—6 of FIG. 2 in the direction of the arrows.
Figure 5:
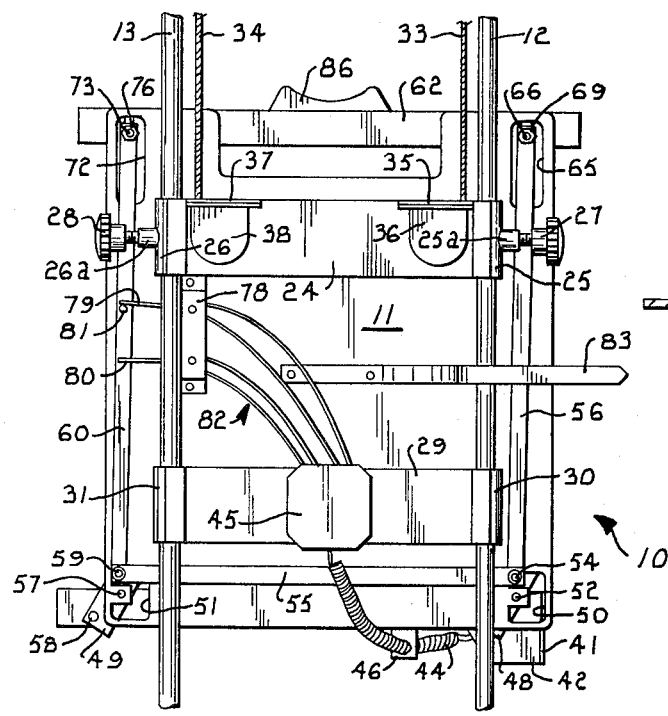
FIG. 5 is an elevational view of the cassette holder taken from the rear of FIG. 4.

Referring now particularly to FIGS. 3, 5 and 6, a plate-like bracket 24 is secured to the back side of plate 11 above the center of the plate. The opposite end portions of bracket 24 are bent rearwardly in two perpendicular bends (FIG. 6), with the bent end portions being secured to respective vertically oriented sleeves 25 and 26. Sleeves 25 and 26 are provided with central cylindrical bores which slidably receive posts 12 and 13, respectively. The side of sleeve 25 is provided with an apertured boss 25a which is threaded to receive a knurled handled set screw 27. An identical set screw 28 is threaded into the aperture of a boss 26a located on the side of sleeve 26. Either or both set screws 27 and 28 may be tightened against posts 12 and 13, respectively, to secure plate 11 in the desired vertical position on the posts.

A second plate-like bracket 29 is secured to the back of plate 11 at a location considerably below bracket 24. The opposite end portions of bracket 29 are bent rearwardly in the same manner as those of bracket 24, and respective vertical sleeves 30 and 31 are weldedly secured to the bent end portions of bracket 29. Sleeve 30 slidably receives post 12 in its central bore, while post 13 is inserted through the central bore of sleeve 31.

A pair of small cables 33 and 34 are secured at their top ends to the respective brackets 14 and 15 and assist in biasing plate 11 upwardly on posts 12 and 13. A horizontal plate 35 (FIG. 3) is secured to extend rearwardly from the top of bracket 24 at one end thereof with an enclosed spring housing 36 attached to the underside thereof. Cable 33 extends freely into housing 36 which contains a conventional coil spring loading mechanism (not shown) that exerts a continuous force on cable 33 tending to wind the cable and thereby urge plate 11 upwardly. Another horizontal plate 37 is secured to the opposite end of bracket 24 and supports another spring housing 38 on its underside. Cable 34 extends into housing 38, containing a similar spring loading mechanism to exert a winding force on cable 34, and to thereby cooperate with cable 33 in urging plate 11 upwardly.

Referring again to FIG. 1, a cassette support for receiving and supporting the X-ray film cassette comprises a horizontal U-shaped channel 40 located near the lower end of plate 11. The back leg of channel 40 is of a greater height than the front leg, while the groove presented by the channel faces upwardly to receive the bottom edge of the cassette. A vertically oriented stop plate 41 is rigidly mounted at the left end (when viewed from the front) of the groove of channel 40 to engage the lower left corner of the cassette for proper positioning of the cassette within the channel groove.

A switch housing 42 is secured by bolts to the underside of channel 40 at the left end thereof. A switch 43 (FIG. 2) extends upwardly from switch housing 42 and through a small opening formed in the bottom of channel 40 adjacent and inwardly of stop plate 41. Switch 43 is biased upwardly to its "off" position as it projects above the bottom surface of channel 40. However, switch 43 may be depressed to its "on" position by the pressure of a cassette positioned properly against stop plate 41. A coiled wire 44, having considerable slack therein, carries the electrical signals emitted by switch 43. Wire 44 extends from switch housing 42 and into a main junction box 45 that is mounted centrally on bracket 29. A small apertured bracket 46 secured to the bottom of plate 11 supports an intermediate portion of wire 44. Additional electrical wiring (not shown) extends from box 45 and is adapted to connect to the X-ray generating unit in a manner to preclude the generator from generating an X-ray beam when switch 43 is in its normal or "off" position. However, the depression of switch 43 to its "on" position by a cassette being positioned against stop plate 41 permits the activation of the X-ray generator.

Channel 40 is mounted for movement on plate 11 by a pair of parallel levers 48 and 49. A pair of C-shaped slots 50 and 51 (which are best seen in FIG. 5) are formed through plate 11 near the bottom of the plate and at opposite sides thereof. Lever 48 is pivotally pinned to plate 11 between the upper and lower legs of C-slot 50 by a pivot pin 52 which also extends through lever 48 and is offset somewhat from both the longitudinal and transverse centers of the lever. A pin 53 pivotally connects the back leg of the channel to lever 48 inwardly of the left end (FIG. 4) of channel 40 and near one end of the lever. Further, the connection is offset from the transverse center of the lever on the opposite side from pin 52. Pin 53 is flush with the forward surface of the back channel leg so that it will not interfere with a cassette positioned in the channel groove.

The lever further includes a stud 54 projecting rearwardly therefrom and extending through C-slot 50. Stud 54 extends from lever 48 at a position near the lever end opposite pin 53 with the stud being transversely offset from the center of the lever on the same side as pin 53. With reference to FIGS. 3 and 5, one end of a horizontal arm 55 and the lower end of a substantially vertical arm 56 are pinned together on the rearward end of stud 54 and are spaced somewhat behind plate 11 due to the length of the stud.

Lever 49 is pivotally pinned to plate 11 between the upper and lower legs of C-slot 51 by a pivot pin 57, which is offset from both the longitudinal and transverse centers of the lever. Another pin, 58, pivotally connects the back leg of channel 40 to lever 49 near the right end (when viewed from the front) of the channel. Further, pin 58 is located near one end of lever 49 and is offset from the transverse center thereof and is flush with the back channel leg so as not to interfere with a cassette supported on channel 40. A stud 59 projects rearwardly from lever 49 and through C-slot 51 near the end of lever 49 opposite pin 58 and is transversely off-set on the same side of the lever as is pin 58. One end of arm 55 and the lower end of a substantially vertical arm 60 are pinned together on the rearward end of stud 59 and are spaced rearwardly from plate 11 due to the length of the stud.

An inverted channel 62 is mounted for vertical movement near the top edge of plate 11. The back leg of channel 62 is of a greater length than the front leg with the channel preenting a downwardly facing groove that is aligned above the groove of channel 40 to receive the top edge of a cassette. A block 63 having a vertical slot 64 extending centrally throughout its length is secured to the forward face of plate 11 at the top left corner of the plate. With particular reference to FIG. 6, the front surface of block 63 is preferably recessed on both sides of slot 64. Plate 11 is provided with a vertical slot 65 that is somewhat wider than slot 64 and is aligned therewith. A stud 66 projects rearwardly from channel 62 near the left end (as viewed from the front) of same. Stud 66 extends closely but slidably through slot 64 and carries a pair of spaced friction washers 67 and 68. Washer 67 bears against the front surface of block 63 within the recessed area thereof, while washer 68 bears against the backside of block 63 within slot 65. The upper end of arm 56 is connected to stud 66 and is retained by a nut assembly 69 that is threaded onto the end of the stud.

The right side of channel 62 is similarly supported on the other vertical arm 60. A block 70 having a vertical slot 71 is secured to the forward surface of plate 11 at the top right corner of the plate. The front surface of block 70 is preferably recessed adjacent slot 71. A large vertical slot 72 is formed through plate 11 and is aligned with slot 71. A stud 73 projects rearwardly from channel 62 and extends slidably through slot 71. A pair of spaced friction washers (not shown) bear against the front and rear surfaces of block 70. The top end of arm 60 is connected to stud 73 and is retained by a nut assembly 76. It is noted that levers 48 and 49 are of the same thickness as blocks 63 and 70 so that channels 40 and 62 are spaced equally from plate 11.

A switch housing 78 is secured to the back of plate 11 at a location somewhat inwardly of arm 60. A pair of switch actuators 79 and 80 extend horizontally from housing 78 and are vertically spaced from one another. One end of each switch actuator 79 and 80 is fixed within housing 78 in a manner to bias the actuators toward a substantially horizontal "off" position, while the opposite or outer end of each actuator is freely located a short distance rearwardly of the vertical arm 60. A stud 81 projects rearwardly from arm 60 at a position to engage one or the other of the switch actuators 79 and 80, depending upon the vertical position of arm 60. When stud 81 engages switch 80 as shown in FIG. 3, actuator 80 is depressed to its switch "on" position wherein it engages its contact within housing 78. Conversely, when stud 81 engages actuator 79 as shown in FIG. 5, actuator 79 is pushed upwardly to its "on" condition. Suitable wiring 82 extends from the respective actuators 79 and 80 to the main box 45. Additional circuitry (not shown) is included which is adapted to connect to the collimator diaphragm controls (also not shown) in a conventional manner whereby the size of the X-ray beam from the collimator is automatically controlled according to which of the actuators 79 and 80 is engaged by stud 81. For example, when a cassette having an effective film 17 inches is of 14 inches × is inserted on cassette holder 10, the engagement of stud 81 with actuator 79 results in a beam having an effective height of 17 inches and a width of 14 inches, while a beam of 14 inches height and 17 inches width results when actuator 80 is depressed by stud 81.

An elongate pointer 83 is secured to the back side of plate 11 at a position midway between channels 40 and 62. Pointer 83 is bent rearwardly behind post 12 and projects horizontally beyond the side of plate 11. A vertical scale (not shown) may be calibrated on the adjacent wall to align with the tip of pointer 83 and thereby indicate the vertical center of a cassette inserted on cassette holder 10. The collimator can therefore be vertically aligned with the cassette by using a corresponding vertical scale that is associated with the collimator.

With particular reference to FIG. 1, a bent bracket 84 is attached to the underside of channel 40. The vertical leg of bracket 84 is spaced forwardly of the front leg of channel 40 to cooperate therewith in presenting an upwardly facing groove which is of sufficient size to receive the bottom end of a filter element (not shown) that is used to filter non-parallel X-rays. A similarly shaped bracket 85 is secured to the top side of channel 62 with the vertical leg of bracket 85 spaced forwardly of the front leg of channel 62. The downwardly facing groove thereby presented is of sufficient size to receive the top edge of the filter element.

A chin rest 86 is centrally mounted on the upper side of bracket 85 and includes a smoothly curved recess formed in its upper edge to conveniently accommodate the chin of a patient. A central portion is cut out of plate 11 at the top thereof to prevent interference when chin rest 86 is located in the lower position shown in FIGS. 2 and 3.

In operation, the collimator is horizontally centered on plate 11 of the wall mounted cassette holder 10. Channels 40 and 62 may be moved between two operative positions to receive a rectangular cassette with the longitudinal axis of the cassette oriented either horizontally or vertically. For illustrative purposes, the operation will be described in connection with a standard size cassette having dimensions of 15 ¼ inches × 18 ¼ inches, which gives an effective film size of 14 inches × 17 because of the ⅝ inches cassette border that normally surrounds the film. However, it is emphasized that certain components of cassette holder 10 may be readily modified to permit the use of cassettes having any desired size.

Figure 2:
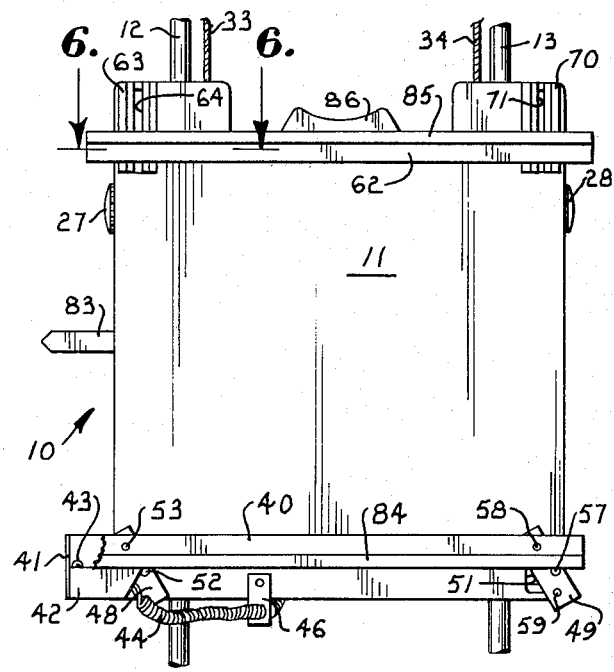
FIG. 2 is a front elevational view of the cassette holder shown in FIG. 1, with the cassette supporting channel located in its uppermost position.

If it is desired to utilize the cassette with its longitudinal axis horizontal, cassette holder 10 is positioned as shown in FIGS. 2 and 3, wherein channels 40 and 62 are spaced 15 ¼ inches apart and stop plate 41 is located 9 ⅛ inches from the horizontal center of plate 11. Plate 11 is then moved vertically on posts 12 and 13 and locked at the desired elevation to properly locate chin rest 86. Since pointer 83 indicates the elevation of the cassette on the adjacent wall scale, the corresponding scale associated with the collimator may be utilized to vertically center the collimator on plate 11. The lower edge of the cassette is then slid into the groove of channel 40 from the right edge thereof, with the upper edge of the cassette entering the groove of channel 62. The cassette is properly positioned by moving it completely to the left and into engagement with stop plate 41. Switch 43 is thereby depressed by the cassette to permit the emission of an X-ray beam from the generating unit. As shown in FIG. 3, stud 81 depresses actuator 80, which causes the associated switch circuitry to automatically adjust the collimator diaphragm to produce a beam having a height of 14 inches and a width of 17 inches. Consequently, the beam is exactly centered on the cassette and is in exact correspondence with the dimensions thereof.

When channels 40 and 62 are in the position of FIGS. 2 and 3, studs 54 and 59 are located in engagement with the extreme ends of the bottom legs of the respective C-slots 50 and 51 and directly below the respective pivot pins 52 and 57. Due to the offset location of the various pins and studs with respect to the levers 48 and 49, the two levers are oriented at a substantial angle from vertical. Therefore, the weight of channel 40 exerts a counterclockwise torque on levers 48 and 49 (as viewed in FIG. 2). Accordingly, levers 48 and 49 are biased by the weight of channel 40 toward their proper positions, and any tendency of the levers to become inadvertently disoriented is resisted. Proper cooperation between studs 54 and 59 is assured by the horizontal arm 55 which interconnects the two studs. The upper channel 62 is maintained at the appropriate vertical position relative to channel 40 by the two vertical arms 56 and 60.

If it is desired to insert a cassette with its longitudinal axis oriented vertically, channel 40 is manually grasped and manipulated properly to pivot levers 48 and 49 clockwise (as viewed from the front) about the respective pivot pins 52 and 57. Studs 54 and 59 are thereby caused to follow corresponding arcuate paths of substantially 180° within C-slots 50 and 51 until channel 40 has been moved to the position of FIGS. 4 and 5. At this position, studs 54 and 59 engage the extreme ends of the upper legs of the respective C-slots 50 and 51 and are located directly above the respective pivot pins 52 and 57. As studs 54 and 59 are thus moved upwardly, arms 56 and 60 cause channel 62 to also move upwardly to the position of FIGS. 4 and 5. Channels 40 and 62 are now spaced 18 ¼ inches apart and stop plate 41 is located 7 ⅝ inches from the horizontal center of plate 11. Plate 11 may then be vertically adjusted on posts 12 and 13 in order to locate chin rest 86 at the desired elevation. Since pointer 83 continues to indicate the midpoint between channels 40 and 62, the vertical centering of the collimator is easily accomplished.

The cassette is then inserted into the groove of channel 40 and slid to the left until it engages stop plate 41 and thereby depresses switch 43. With reference to FIG. 5, actuator 79 is engaged by stud 81, which causes the associated switch circuitry to automatically adjust the collimator diaphragm to produce a beam having a height of 17 inches and a width of 14 inches. Since stop plate 41 locates the cassette in horizontal alignment with the beam, the film contained within the cassette is in exact correspondence with the size and position of the beam.

Figure 4:
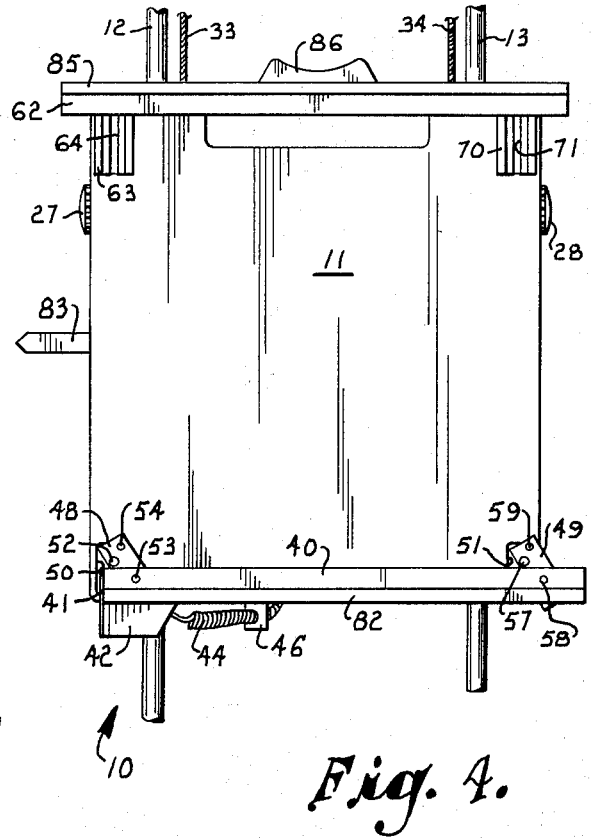
FIG. 4 is a front elevational view of the cassette holder shown in FIG. 1, but with the cassette supporting channel located in its lowermost position.

The offset locations of the various pins and studs on levers 48 and 49 causes the levers to be inclined from vertical when in the position of FIGS. 4 and 5. Consequently, the weight of channel 40 exerts a clockwise torque on levers 48 and 49 (when viewed from the front) to bias the levers toward their proper positions and oppose any tendency of the levers to become disoriented. It is pointed out that the coupling of channel 40 to plate 11 by means of levers 48 and 49 assures that the two operative positions of channel 40 are stable positions. As a result, the proper positioning of channel 40 is facilitated and the channel is maintained in either of its stable positions during operation.

From the foregoing, it will be seen that this invention is one well adapted to attain all of the ends and objects herein set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for supporting and centering a substantially rectangular cassette containing film therein in the path of a substantially rectangular X-ray beam produced by X-ray equipment, said apparatus comprising:
    a frame disposed in a generally vertical orientation and located in the path of said beam;
    a bar member supported on said frame in a substantially horizontal orientation to support said cassette thereon and to vertically center same in the path of said beam;
    lever means coupling said bar member to said frame for vertical movement between a stable upper position wherein said cassette is vertically centered in the path of the beam with its longitudinal axis oriented substantially horizontally and a stable lower position wherein said cassette is vertically centered in the path of the beam with its longitudinal axis oriented substantially vertically, said lever means also effecting horizontal movement of said bar member upon vertical movement thereof between said upper and lower positions; and
    a stop member mounted rigidly on said bar member and moving laterally therewith a preselected distance in response to movement of said bar member between said upper and lower positions, said stop member being engageable with a side of said cassette to horizontally center same in the path of said beam with the longitudinal axis of said cassette oriented either horizontally or vertically.

2. Apparatus as set forth in claim 1, including an upright support, said frame being mounted on said upright support and vertically adjustable thereon with said bar member remaining horizontally oriented.

3. Apparatus as set forth in claim 1, including a switch mounted adjacent said stop member and coupled to said X-ray equipment to normally preclude the emission of a beam therefrom, said switch permitting the emission of a beam upon engagement of said cassette with said stop member.

4. Apparatus as set forth in claim 1, wherein said lever means includes a pair of spaced levers, each of said levers being coupled to said frame for pivotal movement about a stationary axis and pivotally coupled to said bar member at a location offset from said axis, said levers being pivotal about said axes to move said cassette engaging member between said upper and lower positions.

5. Apparatus as set forth in claim 4, including means for coupling said bar member to said levers in a manner to bias said bar member by its own weight toward said upper and lower positions.

6. Apparatus as set forth in claim 1, including a second bar member spaced above said first bar member and coupled thereto for vertical movement in response to movement of said first bar member between said upper and lower positions, said first and second bar members being spaced apart the width of said cassette when in said upper position and spaced apart the length of said cassette when in said lower position, said cassette thereby being engagingly retained between said first and second bar members with the longitudinal axis of said cassette oriented either horizontally or vertically.

7. Apparatus as set forth in claim 6, including means for indicating the elevation of the midpoint between said first and second bar members.

8. Apparatus as set forth in claim 6, including a chin rest mounted on said second bar member.

* * * * *